United States Patent [19]

Hashimoto

[11] Patent Number: 5,603,002
[45] Date of Patent: Feb. 11, 1997

[54] HARD DISK DRIVE HAVING BUFFER MEMORY EMPLOYING DIRECTORY BASED CACHE CONTROLLER WITH DATA REPLACEMENT SCHEME

[75] Inventor: Yasuichi Hashimoto, Tokyo, Japan

[73] Assignee: Kabushiki Kaisha Toshiba, Kanagawa-ken, Japan

[21] Appl. No.: 101,494

[22] Filed: Aug. 2, 1993

[30] Foreign Application Priority Data

Aug. 7, 1992 [JP] Japan ................................ 4-211639

[51] Int. Cl.⁶ .................................................. G06F 12/08
[52] U.S. Cl. ........................ 395/440; 395/404; 395/463; 395/487; 395/403
[58] Field of Search ................................ 395/425, 250, 395/275, 403, 440, 463, 487, 404, 460, 486, 415–419; 364/200 MS File, 900 MS File

[56] References Cited

U.S. PATENT DOCUMENTS

| | | | |
|---|---|---|---|
| 4,464,713 | 8/1984 | Benhase et al. | 395/425 |
| 4,499,539 | 2/1985 | Vosacek | 395/425 |
| 4,593,354 | 6/1986 | Ushiro | 395/425 |
| 4,603,380 | 7/1986 | Easton et al. | 395/425 |
| 4,638,425 | 1/1987 | Hartung | 395/425 |
| 4,882,642 | 11/1989 | Tayler et al. | 360/78.11 |
| 4,920,478 | 4/1990 | Furuya et al. | 395/425 |
| 5,134,563 | 7/1992 | Tayler et al. | 395/250 |
| 5,218,685 | 6/1993 | Jones | 395/425 |
| 5,235,690 | 8/1993 | Beardsley et al. | 395/440 |
| 5,253,351 | 10/1993 | Yamamoto et al. | 395/425 |
| 5,257,370 | 10/1993 | Letwin | 395/650 |
| 5,283,884 | 2/1994 | Menon et al. | 395/425 |
| 5,325,509 | 6/1994 | Lautzenheiser | 395/425 |
| 5,410,653 | 4/1995 | Macon, Jr. et al. | 395/250 |
| 5,418,921 | 5/1995 | Cortney et al. | 395/441 |
| 5,420,998 | 5/1995 | Horning | 395/440 |

*Primary Examiner*—Matthew M. Kim
*Attorney, Agent, or Firm*—Limbach & Limbach L.L.P.

[57] ABSTRACT

A disk drive including a magnetic disk having a plurality of concentric tracks formed thereon and a plurality of blocks each having data recorded on the track and a block address, a buffer memory, divided into plural segments, for storing data retrieved from the disk in each of the buffer memory segments, and buffer memory controller for controlling the buffer memory. The buffer memory controller includes a directory storage memory for storing buffer memory address information in directory segments corresponding to the buffer memory segments, a replacement control information storage memory for storing in each directory segment information relating to a history of use of data for each buffer memory segment. The buffer memory controller determines whether target data are stored in one of the buffer memory segments based on information relating to the target data and the information stored in the directory storage memory, and updates the information stored in the replacement control information storage memory according to a prescribed replacement control rule. The disk drive further includes a data process controller for controlling the buffer memory controller accessing the data in the buffer memory.

11 Claims, 10 Drawing Sheets

| LOGICAL BLOCK ADDRESS | CYL. | HD. | SECTOR 0 | 1 | 2 | 3 | 4 | ... | 48 | 49 |
|---|---|---|---|---|---|---|---|---|---|---|
| 0 ~ 49 | 0 | 0 | (0) | (1) | (2) | (3) | (4) | ... | (48) | (49) |
| 50 ~ 99 | 0 | 1 | (50) | (51) | (52) | (53) | (54) | ... | (98) | (99) |
| 100 ~ 149 | 1 | 0 | (100) | (101) | (102) | (103) | (104) | ... | (148) | (149) |
| 150 ~ 199 | 1 | 1 | (150) | (151) | (152) | (153) | (154) | ... | (198) | (199) |
| | | | | | | | | ⋮ | | |
| 3000 ~ 3049 | 30 | 0 | (3000) | (3001) | (3002) | (3003) | (3004) | ... | (3048) | (3049) |
| 3050 ~ 3099 | 30 | 1 | (3050) | (3051) | (3052) | (3053) | (3054) | ... | (3098) | (3099) |
| | | | | | | | | ⋮ | | |
| 100050 ~ 100099 | 1000 | 1 | | | | | | | | |

FIG. 7

CL.: CYLINDER NO.    HD.: HEAD NO.

| | ACCESS-8 TA: 00030 TL: 10 | ACCESS-9 90000 5 | ACCESS-10 50010 25 |
|---|---|---|---|

```
       0
 0     1
       2    BA0  00333
            BL0  14
            LRU0  6         6         7         7
            FE0   1
      24
      25
 1    26    BA1  77777
      27    BL1  20
            LRU1  5         5         6         6
            FE1   1
      49
      50    BA2  50000                          50010
 2    51    BL2  17                             25
      52    LRU2  4         4         5         0
            FE3   1
      74
      75    BA3  00027
 3    76    BL3  23
      77    LRU3  3         0         1         2
            FE3   1
      99
     100    BA4  22222
 4   101    BL4  5
     102    LRU4  2         3         4         5
            FE4   1
     124
     125    BA5  88888
 5   126    BL5  15
     127    LRU5  1         2         3         4
            FE5   1
     149
     150    BA6  66666
 6   151    BL6  20
     152    LRU6  0         1         2         3
            FE6   1
     174
     175    BA7  ----                 90000
 7   176    BL7  --                   5
     177    LRU7  -        -          0         1
            FE7   0        0          1
     199
```

FIG. 9

HARD DISK DRIVE HAVING BUFFER MEMORY EMPLOYING DIRECTORY BASED CACHE CONTROLLER WITH DATA REPLACEMENT SCHEME

BACKGROUND OF THE INVENTION

1. Field of the Invention

The present invention relates to a disk drive having a buffer control function.

2. Related Art of the Invention

In recent years, the downsizing of hard disk drives (HDD) has greatly progressed and small-sized hard disk drives have been extensively used as external memories for small sized computers including personal computers. In addition, a hard disk controller (HDC) provided with an interface which is used for small systems as the standard equipment has been supplied as a large scale integrated circuit device. This HDC can be built in a hard disk drive (HDD) for a small computer as it is easy to incorporate the HDC in such a system.

When data are transferred between the hard disk controller and a host computer, it is executed in the byte or word mode. However, in the write/read of data to/from a disk, bit serial data is intrinsically read/written. In this case, there exists such a problem that there is a different time restriction between the recording/reproducing operation on the disk recording surface and the data transfer operation between a host computer and an HDD. Therefore, these operations cannot be synchronized completely to each other. For this reason, it becomes necessary to provide a data buffer to store data temporarily. Now it has become a general tendency to equip hard disk drives containing hard disk controllers with a buffer memory in relatively large capacity to give a read ahead function, cache memory function, etc. to the buffer control in order to promote data transfer efficiency and performance. In general, a microcontroller is used in hard disk drives for system control including a hard disk controller. The high level control of the advance reading function and cache memory control described above has become possible using this built-in microcontroller.

This microcontroller is composed of a large scaled integrated circuit (LSI) with a program memory, a data memory, input/output units, a clock generator, etc. integrated on a single substrate.

On the other hand, with a large capacity and high speed transfer resulting from increased recording density coupled with a realization of the high density of semiconductor memory circuits, it has become possible to equip a highly efficient cache memory of balanced cost and performance to a hard disk drive relatively easily and also, it has been strongly demanded.

A data hit judgment (a so-called hit judgment) has been used to judge whether data existing in the buffer memory has the same address on the disk as that of data being accessed, and a replacement algorithm is used as a replacement rule governing replacement of data in a buffer memory having been realized by the built-in microcontroller.

Because of the above, if a buffer memory has been improved to a highly efficient level, such a problem will come out that a relatively large time may be required for these processes and an overhead time of the microcontroller may become long, correspondingly. Therefore, it may become necessary to take measures, for instance, to use a highly efficient microcontroller and a high speed program memory or to improve performance using a plurality of microcontrollers or to adjust functions corresponding to the processing capacity.

The overhead time referred to here is a time from when the microcontroller receives a command from a host computer to when the magnetic head actually begins to move.

SUMMARY OF THE INVENTION

The present invention has been made in view of the points described above and it is an object of the present invention to provide a disk drive which is capable of realizing a highly efficient cache memory function at a relatively cheap cost and reducing an overhead time required for a buffer memory control by combining an existing microcontroller with relatively small-sized hardware.

According to the present invention there is provided a disk drive comprising a magnetic disk having a plurality of concentric tracks formed thereon and a plurality of blocks each having data recorded on the track and a block address; means for rotating the magnetic disk; means for recording and retrieving the data on and from the tracks; buffer memory means divided into plural segments for storing data retrieved from the disk in each of the buffer means segments; buffer memory control means for controlling the buffer memory means, the buffer memory control means including: directory storage means for storing buffer means address information in directory segments corresponding to the buffer means segments; replacement control information storage means for storing in each directory segment information relating to a history of use of data for each buffer means segment; means for determining whether target data are stored in one of the buffer means segments based on information relating to the target data and the information stored in the directory storage means; and replacement control means for updating the information stored in the replacement control information storage means according to a prescribed replacement control rule; and data process control means for controlling the recording and retrieving means and the buffer memory control means accessing the data in the buffer memory means.

BRIEF DESCRIPTION OF THE DRAWINGS

FIGS. 6A to 6C are the diagrams for explaining the sector servo system in which FIG. 6A shows the construction of the recording surface, 6B shows the construction of the track and 6C shows the construction of the sector;

FIG. 7 is a diagram for explaining the basic cache control and shows the relationship between logical block addresses of a host computer and data memory positions of the hard disk drive;

FIG. 9 is a diagram for explaining the highly functional cache control when the buffer memory is segmented.

DETAILED DESCRIPTION OF THE PREFERRED EMBODIMENTS

Hereinafter, the hard disk drive involved in an embodiment of the present invention will be described in detail with reference to the drawings.

First, before explaining the cache control of the present invention, the basic construction and operation of the hard disk drive will be described.

Figure 5:
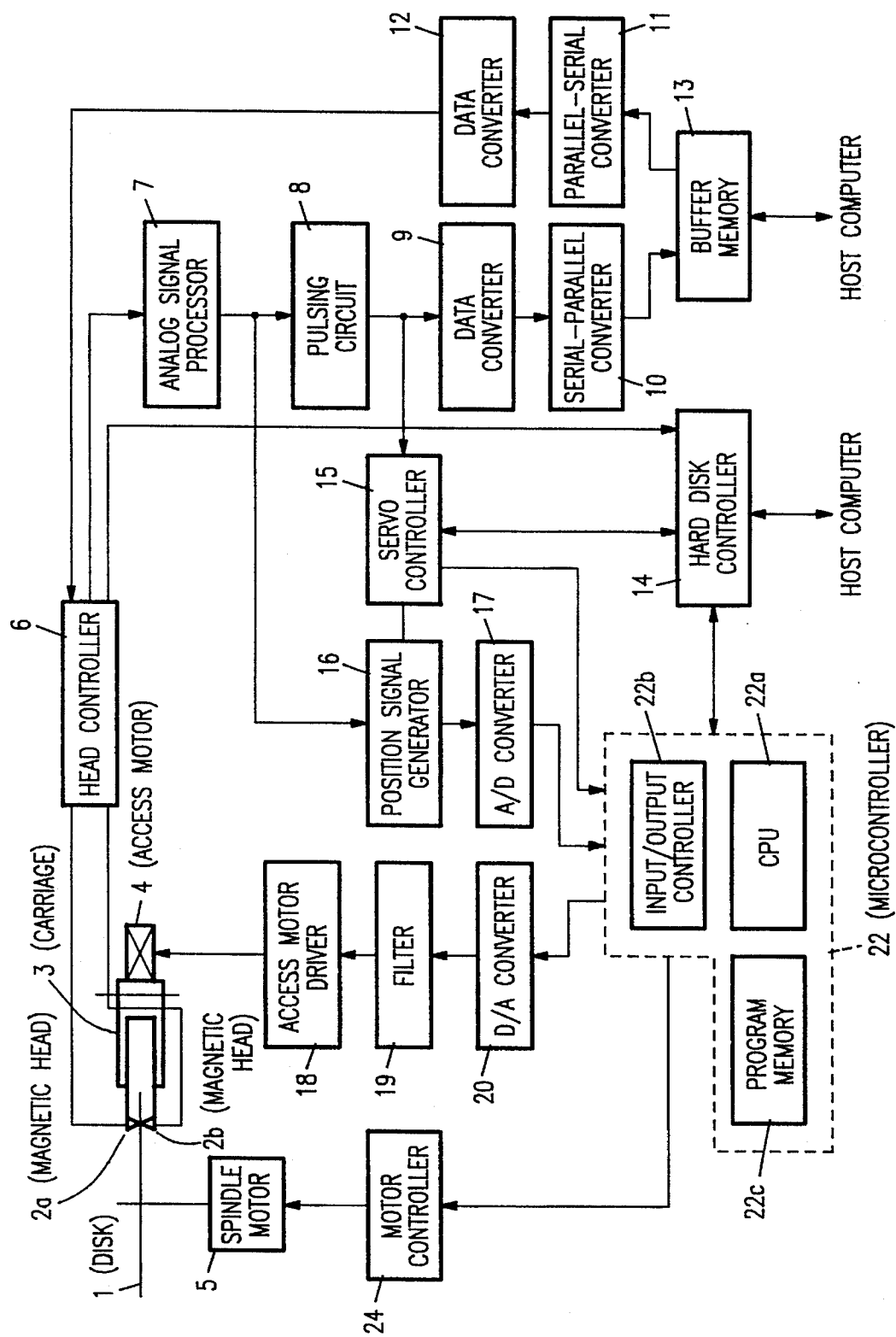
FIG. 5 is a block diagram showing the basic construction of the hard disk drive of the present invention.

FIG. 5 is a diagram showing the construction of the hard disk drive. In FIG. 5, a disk 1 as a recording medium is driven to rotate by a spindle motor 5. A plurality of tracks are provided in a concentric circle shape on the recording surface of the disk 1 and data are recorded on or reproduced from these tracks. Data are divided into small blocks called sectors and data are recorded/reproduced for each of these sectors. That is, plural sectors are contained in one track.

In the case of a hard disk drive employing a data surface servo (Embedded Servo) system, servo information are generally recorded in the tracks at regular intervals. In the case of a data surface servo system called a sector servo system, servo information is made available for every sector boundary conforming to the data recording sector. In this case, some hard disk drives may arrange servo information on the tracks independently of data sectors. Here, however, to make the explanation simple, it is described using an example of the sector servo system which has servo sectors conforming to data sectors.

Figure 6A:
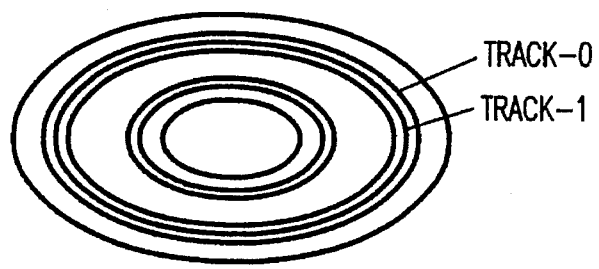
Figure 6B:
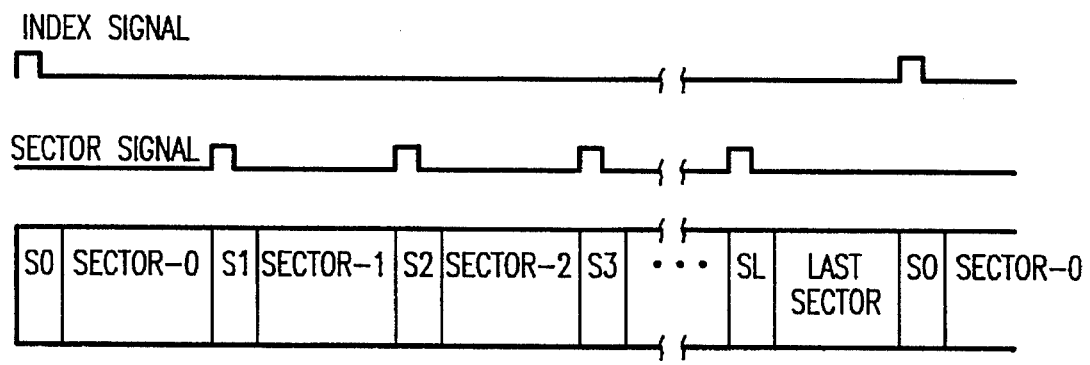
Figure 6C:
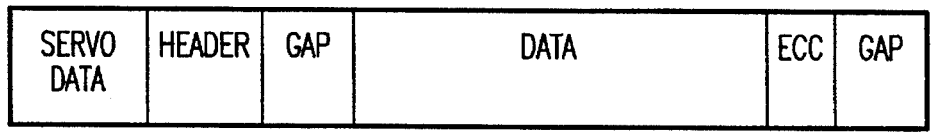

FIGS. 6A to 6C show examples of the construction of the tracks in the case of the sector servo system. As shown in FIG. 6A, a plurality of tracks are provided on the concentric circles on the disk surface. Each track is defined when corresponding servo data are recorded for each track. Servo data are generally recorded by a specific manufacturing facility during the course of manufacturing the disk. To identify each of these tracks, a track number (address) is assigned to each track based on its physical position.

Both sides of a disk are generally used for recording, and in this case, two same track addresses exist. Tracks in this relationship are generically referred to as the cylinder. strictly speaking, the magnetic head accesses the cylinder and selects a track by specifying the magnetic head from the cylinders. This also applies when there are plural disks. Also, each magnetic head is assigned with a head number (address) by which the head can be specified based on its physical position.

As shown in FIG. 6B, each track includes a plurality of sectors. The lengths of sectors of the tracks are generally uniform. S0, S1, S2 . . . indicate servo data and in the case of the sector servo system, they are recorded for each sector. The servo data is composed of absolute address information inherent to each sector, burst data as position information and index pattern for the top sector S0, or sector pattern for other sectors S1, S2 and so on. Each sector includes plural data bytes. Here, to make the explanation simple, the following description will be made assuming fixed length sectors.

When accessing data on a disk, a host computer divides target data according to sector size, defines a block in the same size as the sector and identifies individual data by assigning a logical block address to this block. A host computer executes read/write of data on a magnetic disk by specifying this logical block. On the other hand, on a hard disk drive, a sector number (address) is assigned to each sector based on its physical position so that respective sectors can be principally specified. If the data logical block address is specified by the host computer, individual logical blocks are brought to correspond with respective physical sectors according to the preset standard in the hard disk drive. Data in the buffer memory are generally identified using logical block addresses but physical sector addresses are also usable for this purpose.

As shown in FIG. 6C, the sector is roughly composed of the header section and the data section and in addition, ECC (Error Check and Correction Code), GAP (Timing Gap for Recording/Reproducing Operations), etc. are included. The header section is composed of sector address information, information showing sector attributes, information for data synchronization, error check code, etc. The data section is composed of data synchronization information and target data.

Returning to FIG. 5, magnetic heads 2a and 2b for data recording and reproducing have been mounted to a carriage 3. When the carriage 3 moves, the magnetic heads 2a and 2b are moved on the surface of the disk 1 in the radial direction (the direction crossing the track), and positioned at the center of the track for reading/writing data. The carriage 3 is equipped with an access motor 4 and is driven by this motor. A rotary type or a linear type voice coil motor (VCM) is often used as the access motor 4.

The magnetic heads 2a and 2b are controlled by a head controller 6. This head controller 6 includes a head selection circuit, a head driving circuit for data writing, a head amplifier for data reading, write abnormality detecting circuit, etc. Generally, while a write signal is being supplied, driving current is supplied to a selected head and data are recorded. On the other hand, when no write signal is supplied, magnetically recorded information passing under the selected head are reproduced and output continuously.

An analog signal processor 7 is connected to the head controller 6. In the case of the hard disk drive, an automatic gain control circuit, a filter, a waveform equivalent (equalizer), etc. are included in this analog signal processor 7. When reading data, in order to digitize recording information, the waveform of reproducing signal supplied from the head controller 6 is processed to improve reliability of the signal detection. Further, an analog signal obtained here is processed properly for the servo information portion and reproduced as a position signal and used for control.

A pulsing circuit 8 is connected to the analog signal processor 7. This pulsing circuit 8 is composed of an A/D converter and converts recording information into pulses based on signals from the analog signal processor 7. The pulsing circuit 8 contains a differentiating circuit, a filter, a signal comparator, etc. and obtains maximum and minimum values of analog signal by detecting the polarity change point and after binarization, outputs them as readout pulses.

A data converter 9 is connected to the pulsing circuit 8. This data converter 9 contains a PLL (Phase Locked Loop), a signal discriminating circuit, a read data decoder, etc. When a data reading instruction is given, the PLL prepares a data discriminating window with frequency and phase synchronized with input data. Readout pulses are discriminated using the prepared data discriminating window, and a record format data string is reproduced and input to a decoder. The decoder decodes reproduced data according to a prescribed decoding rule and outputs the signal of the result.

The data converter 9 is connected with a serial-parallel converter ID. This serial-parallel converter 10 converts bit serial data signal input from the data converter 9 into byte mode parallel data. The converted byte mode data are stored in a buffer memory 13. In writing data, it is necessary to convert data from a host computer into record form data suited for magnetic recording. As a recording form in this case, for example, an MFM (Modified Frequency Modulating) system and a RLL (Run Length Limited) system are well known.

A parallel-serial converter 11 connected to the buffer memory 13 converts byte data which are input from the buffer memory 13 into bit serial data and supplies it to a data converter 12. The data converter 12 converts the bit serial data from the parallel-serial converter 11 into record format data according to a preset conversion rule and transfers them to the head controller 6 conforming to a write instruction signal.

The data exchange with the host computer is executed through the buffer memory 13. Data from the host computer are received conforming to the timing of the host computer and temporarily stored in this buffer memory 13. The data thus taken in are taken out conforming to a record position on the rotating disk 1, converted into bit serial data in the parallel-serial converter 11 and then, into record format data and recorded on the disk 1. On the other hand, if data are requested by the host computer, read data are stored in the buffer memory 13 when reproduced from the disk 1. Therefore, data are taken out of the buffer memory 13 and sent to the host computer according to the receiving timing of the host computer.

Figure 1:
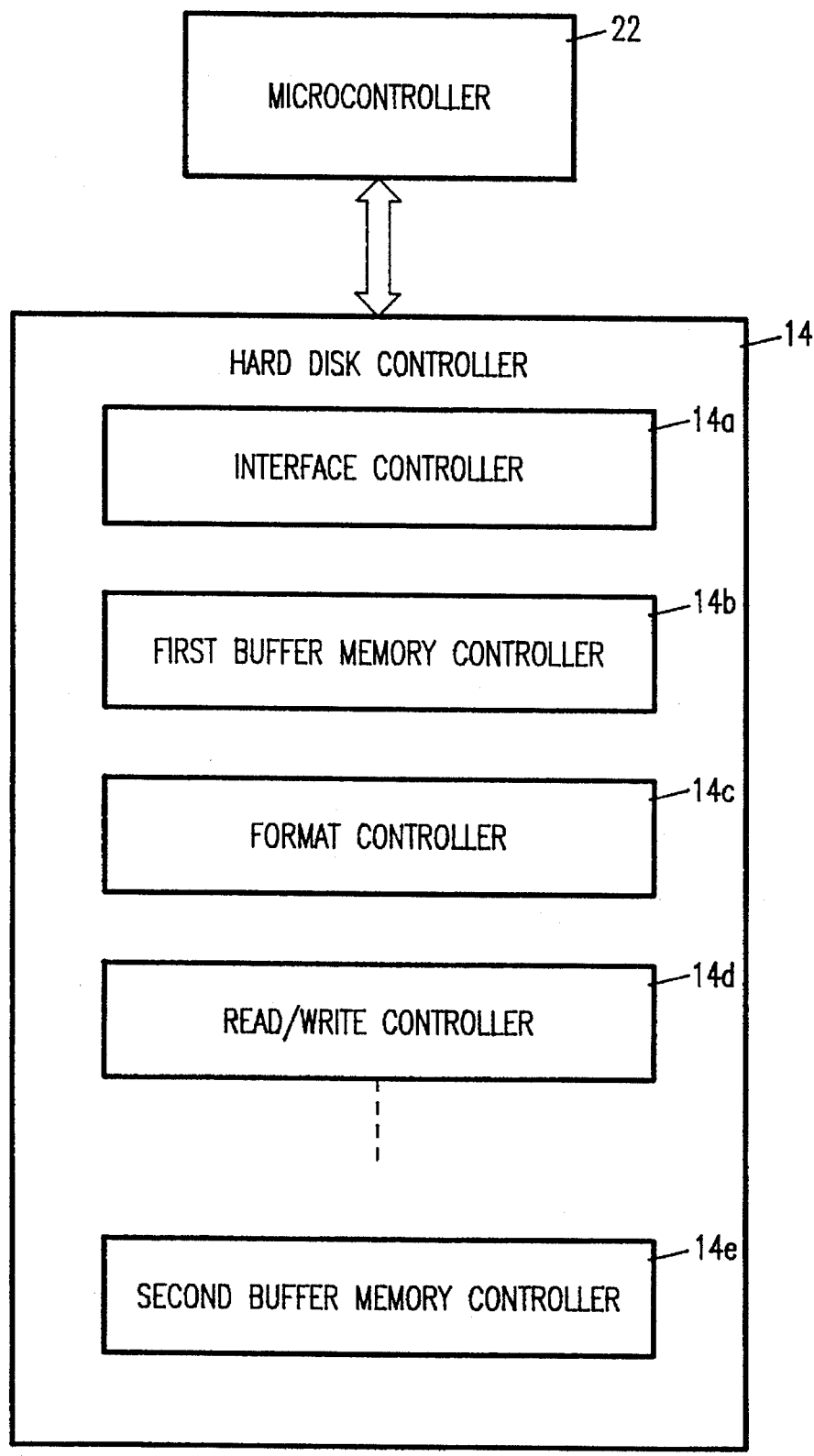
FIG. 1 is a diagram showing the construction of a hard disk controller (HDC) which is used in a hard disk drive (HDD) involved in an embodiment of the present invention.

A hard disk controller 14 (HDC) is connected to the head controller 6, the buffer memory 13, a servo controller 15 and a microcontroller 22. The HDC 14 contains an interface controller 14a, a first buffer memory controller 14b, a format controller 14c, a read/write controller 14d and in addition, a second buffer memory controller 14e in this case as shown in FIG. 1.

The interface controller 14a exchanges signals, commands and data with the host computer. When a command is transferred from the host computer, the interface controller 14a stores the command and parameters accompanied thereto temporarily and informs the microcontroller 22 of receipt of the command using an interruption, etc. When transferring data, the interface controller 14a sends/receives data in response to a data request signal or a data receiving signal.

The first buffer memory controller 14b prepares read/write control signals and controls buffer addresses for data access to the buffer memory 13.

The format controller 14c and the read/write controller 14d control timings depending upon hardware for executing data recording/reproducing to the disk 1. Further, by detecting an index and a sector signal on the track, they generate read/write timings and send a control signal to related functional blocks so that data are transferred between the buffer memory 13 and the magnetic heads 2a and 2b according to the generated read/write timings. These controllers operate basically under the control by the microcontroller 22. Therefore, such operations as supply of required information to the microcontroller 22 by interpreting contents of the header record portion to be read out of the disk 1, detection of readout error, process for data correction, etc. are executed by these controllers.

Figure 2:
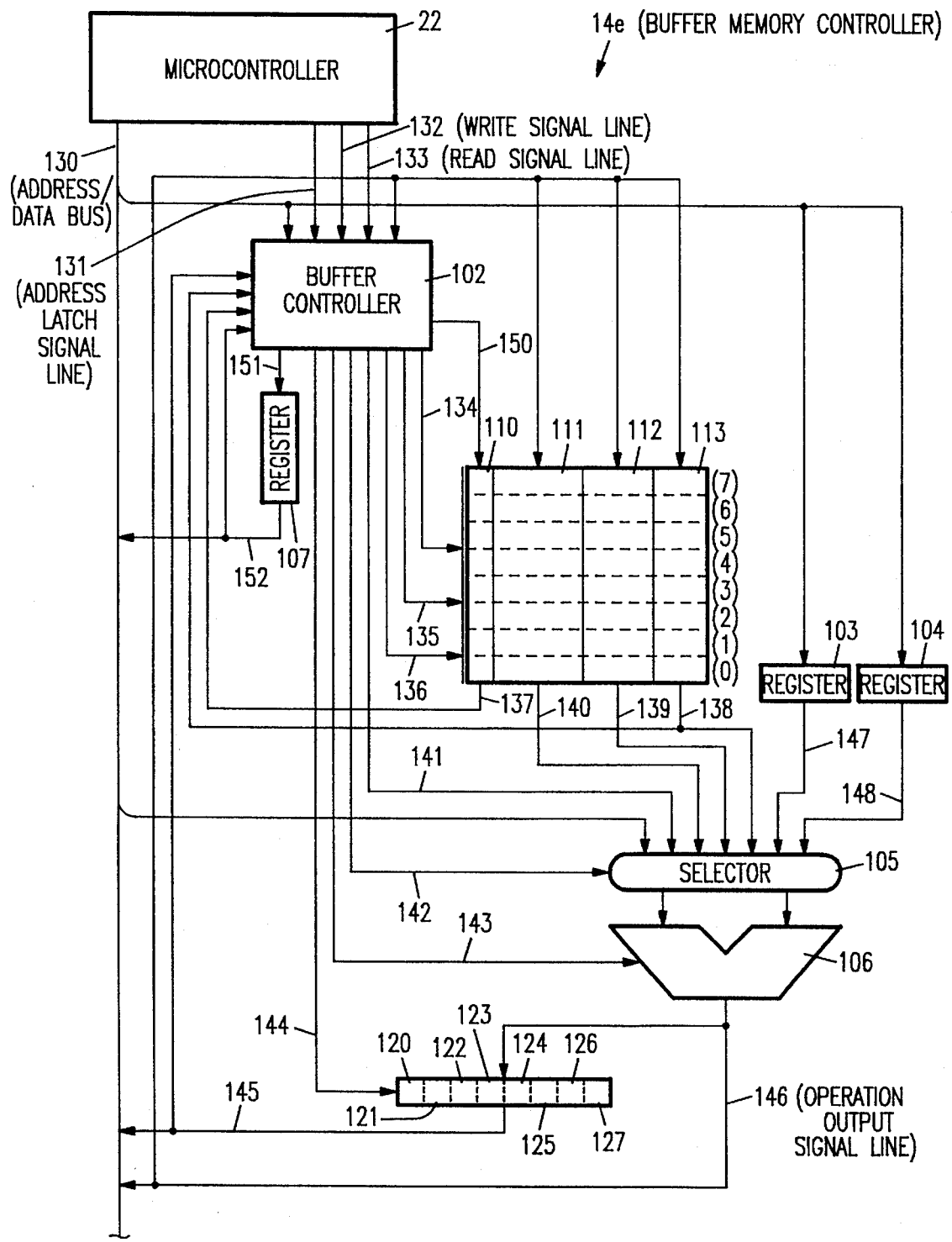
FIG. 2 is a diagram showing the construction of the hardware of the buffer memory controller contained in the hard disk controller shown in FIG. 1.

In this embodiment, the second buffer memory controller 14e is additionally provided separately from the controllers 14a through 14d described above. This second buffer memory controller 14e is for executing such cache control as hit judgment, selection of replacing segments, updating of LRU counter, etc. and had been so far realized by software of the microcontroller. This embodiment of the present invention is characterized in that this function has been realized by such hardware as shown in FIG. 2.

This second buffer memory controller 14e differs from the first buffer memory controller 14b so far available in that, while the first buffer memory controller 14a executes mainly the address control (the control as to how data are to be actually read/written) the second buffer memory controller 14e executes mainly the cache control (the process by the existing microcontroller). This second buffer memory controller 14e will be described hereinafter in detail with reference to FIG. 2.

The servo controller 15 detects a pattern of readout pulses that is output from the pulsing circuit 8 and servo data reference signal and based on them, generates a prescribed data discriminating window and decoding servo data, generates index and sector signals and interrupt signals and sends them to the microcontroller 22. Further, the servo controller 15 generates a sample timing signal to take out analog position signals and supplies it to a position signal generator 16.

This servo controller 15 is connected to the pulsing circuit 8. The position signal generator 16 is connected to the servo controller 15 and the analog signal processor 7. This position signal generator 16 takes out an analog readout signal which is output from the analog signal processor 7 based on the sample timing signal which is input from the servo controller 15, accumulates its amplitude value, and outputs to an A/D converter 17.

The A/D converter 17, which is connected to the position signal generator 16, receives a servo signal which is sample holding position information from the position signal generator 16, and converts its size to a binary signal and outputs it to the microcontroller 22.

The microcontroller 22 is connected to the A/D converter 17, the servo controller 15 and a D/A converter 20, and is composed of a CPU 22a, an input/output controller 22b and a program memory 22c. Information for servo control is input to this microcontroller 22 from the servo controller 15 and the A/D converter 17, and after processing this information according to the pre-programmed processing procedures, the result is output to the D/A converter 20. The control signal that was converted to an analog signal by the D/A converter 20 is supplied to an access motor driver 18 through a filter 19, which is for obtaining a proper response, and positions the magnetic heads 2a and 2b by driving the carriage 3.

A disk rotating motor controller 24 connected to the microcontroller 22 detects the rotating position of the disk by observing the interface signal of the spindle motor 5 and supplies the detection signal to the microcontroller 22. The microcontroller 22 decides the size of driving current corresponding to a phase and a time to supply current and a rotating speed based on the signal from the motor controller 24, and generates a signal for controlling the rotation and supplies this signal to the motor controller 24.

Next, the cache control operation will be described using a definite example.

Figure 8:
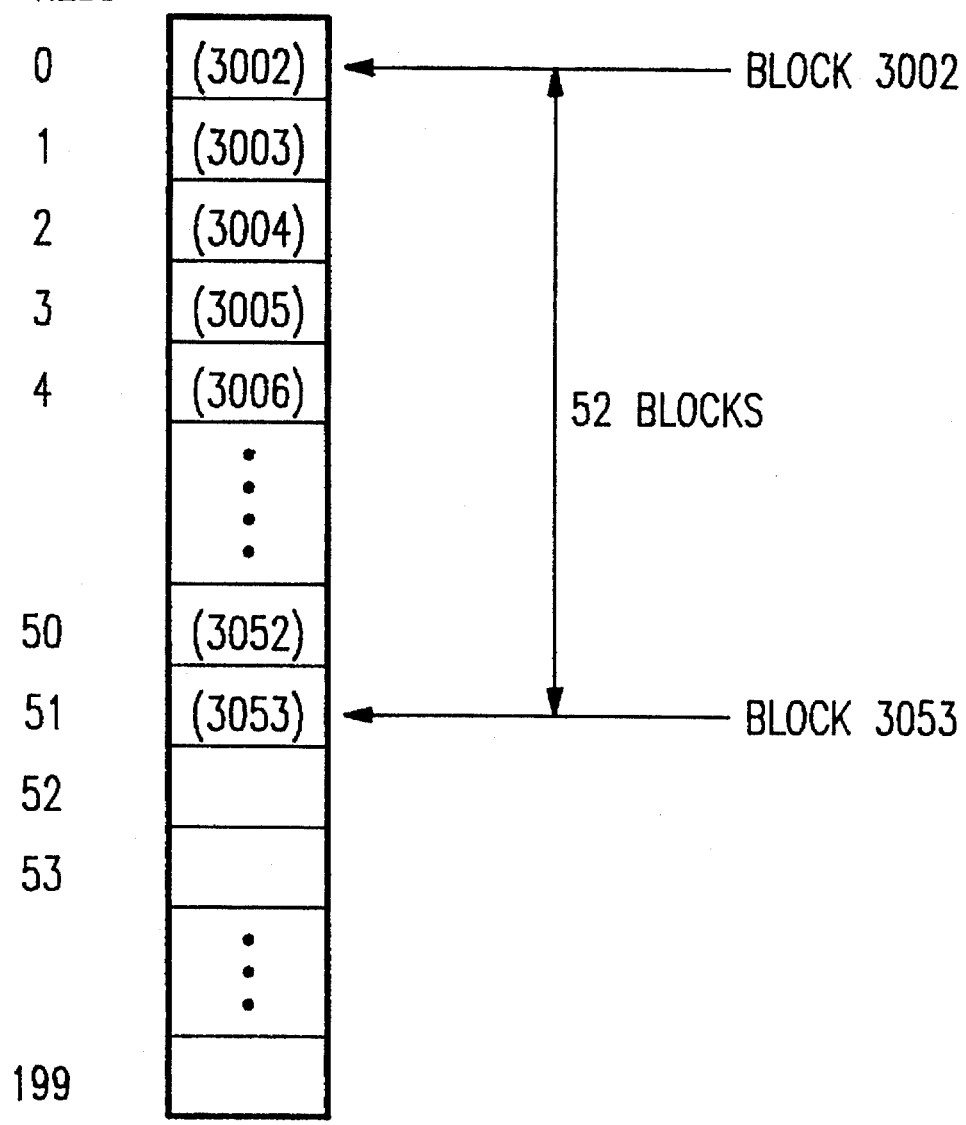
FIG. 8 is a diagram for explaining the cache control and shows a data storage method for the buffer memory.

FIG. 7 and 8 show the correspondence of logical addresses for data handling by the host computer with sectors recorded on the disk and the state of storing data in the buffer memory in the most basic method of use.

FIG. 7 shows the correspondence of logical block addresses of the host computer with data recording positions in the hard disk drive. In the case of this example, the disk has 50 sectors in the tracks with two heads (the head—"0" and "1") provided. Therefore, two tracks are available for one cylinder. Further, the sector numbers are consecutively assigned to the sectors starting from "0" assigned to the first sector of the cylinder "0" and the head "0" to "49" assigned to the last sector. The sector "50" will become the first sector of the cylinder "0" and the head "1".

When the sector numbers are assigned as described above and if the host computer specifies the writing of 52 blocks starting from the logical address "3002", the hard disk drive moves the heads "0" and "1" to the cylinder "30" and selecting the head "0", writes data into 52 consecutive sectors from the third sector of the track. At this time, data transferred from the host computer are transferred to the buffer memory independently of the record timing to the disk and stored in the buffer memory as shown in FIG. 8.

When the magnetic head is positioned on the desired track and the sector which is a subject of writing is detected, data are sequentially taken out of the buffer memory and recorded on the disk. Even after all data have been recorded on the disk and the command execution has been completed, the data are left remained in the buffer memory. Immediately after, however, if a command is given by the host computer to the disk to read out one of the blocks "3002" through "3053", it is not necessary for the hard disk drive to actually read data from the disk but they can be transferred directly to the host computer from the buffer memory. In this case, the disk is not needed to wait until the magnetic head reaches the target sector and further, when the host computer is able to receive data at a high speed by reading bit paralleled data out of the hard disk drive (the buffer memory), data are actually transferred at an extremely high speed.

Thus, it is possible to improve the efficiency using a buffer memory. However, if the host computer demands data that are not existing in the buffer memory, this effect will not be obtained. In order to improve the disk cache efficiency using the buffer memory, a method is used where segments are defined by dividing a buffer memory, the contents of the buffer memory are controlled for each of these segments so that an access demand from the host computer hits data in the buffer memory at a probability that is as high as possible. Referring to FIG. 9, an example of this case will be described.

Hereinafter, the high functional cache control operation will be described using a definite example.

FIG. 9 shows an example of a buffer memory which is segmented and controlled efficiently as a cache memory. This is an example of a segment cache with a buffer memory capable of storing data of 200 blocks segmented into eight segments in the same length.

This cache control adopts a segment data replacing method called the LRU (Least Recent Used) method in which data are stored in the accessed sequence and when all segments have been once used, most previously accessed segment data are replaced with least recently accessed data. Therefore, a counter called the LRU counter is used to show history of use. Further, a flag called a validity flag is used to show whether data in the buffer memory are valid. When data are input to the buffer memory, this flag is set to "1", and it is set to "0" if no data is input in the buffer memory or when data in the buffer memory are not used for some reason. In addition, as a matter of course, information showing logical addresses of data in the buffer memory and block lengths of valid data existing therein must be controlled at the same time.

In FIG. 9, as to each segment, for instance, Segment No. n, the top logical address of data in the segment is shown as BAn, and in the similar manner, data length as BLn, LRU counter value as LRUn and segment validity flag as FEn. Further, the abbreviations TA and TL denote the target data starting logical address (TA) to which the host computer accesses and its data block length (TL).

Now, the operations will be described definitely successively.

First, as shown in the first example, the operations will be explained starting from the state where seven segments (Segment "0" to Segment "6") already exist in the accessed sequence in a buffer memory. It is assumed that a host computer instructs a read out of data from the logical address "00030' (TA=00030) to ID blocks (TL=10) under this state. In this case, as this target data exists in the segment "3", corresponding data are taken out of this segment "3" and transferred to the host computer. At this time, the LRU counter of the segment "3" is updated to "0" to show that it was lastly used and the LRU counters of the segments "4", "5" and "6" showing so far that they were used after the segment "3" are updated by increasing the values by "1", respectively.

Next, it is assumed that data of five blocks from the logical address "90000" have been accessed. As these data do not exist in the buffer memory, data are newly stored in the buffer memory. As the validity flag FE7 of the segment "7" is "0", it is discriminated that this segment has not been-used yet and the target data are stored in this segment. Therefore, even if data are newly taken in the buffer memory, all the existing data are not vanished. Further, in this case, the LRU counter of the segment "7" is also updated to "0" to show that the segment "7" was lastly accessed, the LRU counters values of all segments are updated by increasing them by "1" and the flag FE7 is set to "1" to show that valid data exist in the segment "7".

If it is instructed successively to write data for 25 blocks from the logical address "50010", as the applicable blocks are partially existing in the segment "2", target data are stored in this segment. In this case, all the existing data in the segment vanish as new data are written into the segment, and target data are filled in the segment from its top and a logical block address and valid data length are newly set up. In this case, the LRU counter values for all segments having less LRU counter value than the former LRU counter value (=5) of the segment "2" are also updated.

The buffer memory can be used as an efficient cache memory by controlling it in the manner as described above.

In order to realize a cache memory which executes such operations as described above, it is necessary to execute many address comparing operations to judge whether target blocks are existing in the buffer memory. In addition, many processes also become necessary to check and update LRU counter values corresponding to the state of data in the buffer memory. Therefore, if the process is executed only by the built-in microcontroller as before, a processing time of respective accesses will become a problem and it is difficult to execute such a high level of control as described above. It is an object of the present invention to reduce such a large operating time and provide an efficient and high performance cache memory function.

That is, the present invention provides a means for improving the buffer memory 13, the disk controller (HDC)

14 and the data processors (22a, 22b, 22c), for highly promoting efficiency of the buffer memory of the hard disk drive at a relatively cheap cost and for constructing a well balanced cache memory.

Definitely speaking, a highly efficient disk cache system is constructed by dividing the buffer memory 13 into plural segments and controlling the method for using the buffer memory 13 for each segment. In order to promote the segment control to a highly efficient level, the disk controller 14 is provided with the second buffer memory controller 14e equipped with a means for storing information relating to data block addresses within a segment for all segments, a means for storing information relating to a history of using respective segments, a means for comparing information relating to block addresses to be accessed with information block addresses of data in segments, etc. and judging whether target data for access are available in the buffer memory in a short time based on the instruction from the microcontroller 22, the result being sent to the microcontroller 22.

Further, this second buffer memory controller 14e is provided with a function to judge and update information relating to a history of use in order to replace data in the buffer memory 13 and processes selection of segments to be replaced and updating of a history at a high speed according to the instruction from the microcontroller 22.

Based on the result of judgment as to whether target data for access are existing in the buffer memory 13, the microcontroller 22 decides as to whether data in the buffer memory 13 or data on the disk 1 are to be accessed. Further, when accessing data in the buffer memory 13, the microcontroller 22 judges how many data are to be accessed from which portion of the buffer memory 13 and gives an instruction to the disk controller 14 to control data. The second buffer memory controller 14e judges whether data in the buffer memory are to be replaced or not and if the replacement is required, decides a segment to be replaced and updates information on data in the segment.

Hereinafter, the cache control operation of the present invention will be described using definite examples. However, the scope of the present invention will not be restricted by the definite examples presented here.

As shown in FIG. 1, the disk controller (HDC) 14 of the present invention is provided with the second buffer memory controller 14e and hardware for executing the cache control described above.

The definite hardware construction of the second buffer memory controller 14e is shown in FIG. 2. A buffer controller 102 is connected to the microcontroller 22 through an address/data bus 130, an address latch signal line 131, a write signal line 132 and a read signal line 133 and the buffer controller 102 is controlled by signals sent through these signal lines from the microcontroller 22.

Figure 3:
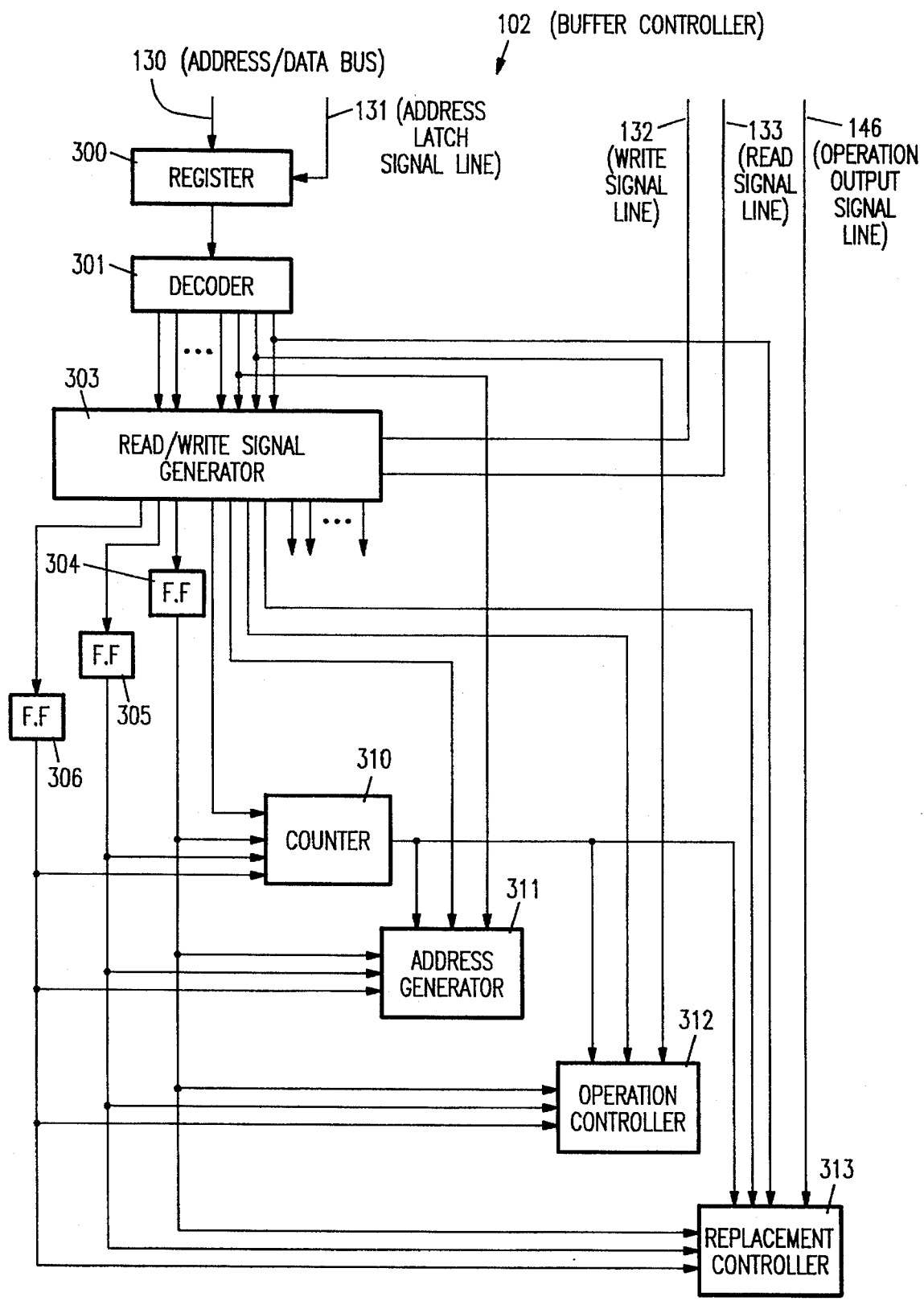
FIG. 3 Is a diagram showing the construction of the buffer control circuit in the buffer memory controller shown in FIG. 2.

FIG. 3 shows the example of the construction of the buffer controller 102. The buffer controller 102 includes an address latch register 300, an address decoder 301, a read/write signal generator 303, a flip-flop 304 for hit judging, a flip-flop 305 for segment selecting, a flip-flop 306 for LPU adjusting, a counter 310, a directory address generator 311, an operation controller 312, a replacement controller 313, etc. This buffer controller 102 decodes addresses of the microcontroller 22, generates control signals for writing data to and reading data from the functional circuit in the second buffer memory controller 14e, starts the operation timing generator, and further, generates control signals for counting, addition/subtraction control, comparator control, etc.

Returning to FIG. 2, the cache control will be described again. A target address register (the fifth storage means) 103 and a target blocks register (the sixth storage means) 104 are connected to the microcontroller 22 and data are written into these registers 103 and 104 by the microcontroller 22.

Numerals 110 to 113 denote the directory registers (the first through fourth storage means) For all segments (in the case of this example, Segment Numbers "0" to "7") the register 110 stores the segment valid flag (FE in FIG. 9), the register 111 stores block address (BA in FIG. 9), the register 112 stores the number of blocks (BL in FIG. 9) and the register 113 stores LRU value (LRU in FIG. 9).

Numeral 106 denotes an adder-subtracter. Input information to this adder-subtracter is selected by a selector 105 and a control signal for this selection is supplied from the buffer controller 102.

Numerals 120 to 127 denote the hit flag registers (the seventh storage means). If it is found that all or part of target blocks exist in the segments by comparing the contents of the directory registers 110 to 113 with target block address information, the hit flag registers 120 to 127 corresponding to these segments are set. These contents are read out by the microcontroller 22 and used for control purposes.

Numeral 107 denotes a segment designation register (the eighth storage means). Segment numbers are set in this register 107 and are used to designate specific segments. It is also possible to directly designate segments by the counter 310 (shown in FIG. 3) or the microcontroller 22 in addition to this register 107. Further, this register 107 is automatically set at the time of the judging operation or by the microcontroller 22.

Numeral 134 denotes a directory memory address signal line, and 135 and 136 denote write and read signal lines for the directory registers 110 to 113, respectively. Numeral 150 denotes a write data signal line for the register 110 storing the segment valid flag, 137 denotes a segment valid flag read signal line, 138 denotes an LRU value output signal line, 139 denotes a segment data blocks information output signal line and 140 denotes the segment data starting block address information output signal line.

Numeral 141 denotes a signal line to input constants required for an operation, 142 denotes a data selection control signal line to select input data to a computing unit and 143 denotes an operation control signal line. Numeral 144 denotes a read/write control signal line relative to the hit flag and 145 denotes a hit flag output signal line. Numeral 146 denotes an operation output signal line. Numeral 147 is a target data start block address information output signal line, 148 denotes a block number information output signal line, 151 denotes an input signal line to the segment designation register 107, and 152 denotes an output signal line from the segment designation register 107.

Next, the operation of the second buffer memory controller 14e constructed as described above will be explained.

When starting the operation, the flag "0" has been set in the directory register 110 for all segments. Under this state, if, for instance, a read-command for the block address "00333" and the block number "14" is given from the host computer, the microcontroller 22 sets the block address "00333" in the register 103 and the block number "14" in the register 104 and setting the flip-flop 304 for hit judging in the buffer controller 102, gives a judging instruction. As the flags set in the directory register 110 are all "0" at this time, no hit flag is set. Therefore, the microcontroller 22 sets the flip-flop 305 and gives a segment selecting instruction. As a result, the segment number "0" is set in the register 107. At this time, the microcontroller 22 reads target data from the disk 1 and transfer it to the host computer by controlling all control circuits and at the same time, and also stores this data in the selected segment "0" of the buffer memory 13.

Further, the microcontroller 22 stores information relative to this data in the segment "0" of the directory memory. That is, for the "0"' line of the directory memory, the block address "00333" is set in the directory register 111, the block number "14" is set in the directory register 112 and the LRU value "0" is set in the directory register 113, and a flag is set in the directory register 110 to make this segment valid.

In the similar manner, for instance, if the block address "77777" and the block number "20" are accessed, data and a directory relative to this block are set in the segment "1". After setting them, in order to adjust the LRU value in the directory register 113, the microcontroller 22 sets the flip-flop 306 and gives an instruction to adjust the LRU value. As a result, since the segment "0" is valid, the LRU value in the directory register 113 for the segment "0" is set to "1" and the LRU value in the directory register 113 for the segment 1 is set to "0".

Similarly, if, for instance, it is instructed to read or write data in order of the block address "50000" and the block number "17", the block address "00027" and the block number "23", the block address "22222" and the block number "5", the block address "88888" and the block number "15", and the block address "66666" and the block number "20", a directory is generated like the initial state shown in FIG. 9 and corresponding data are existing in the buffer memory 13.

Under this state, if it is instructed to read data of the block address "00030" and the block number "10" the microcontroller 22 operates as described below. The operation will be explained referring to the timing chart shown in FIG. 4.

Figure 4:
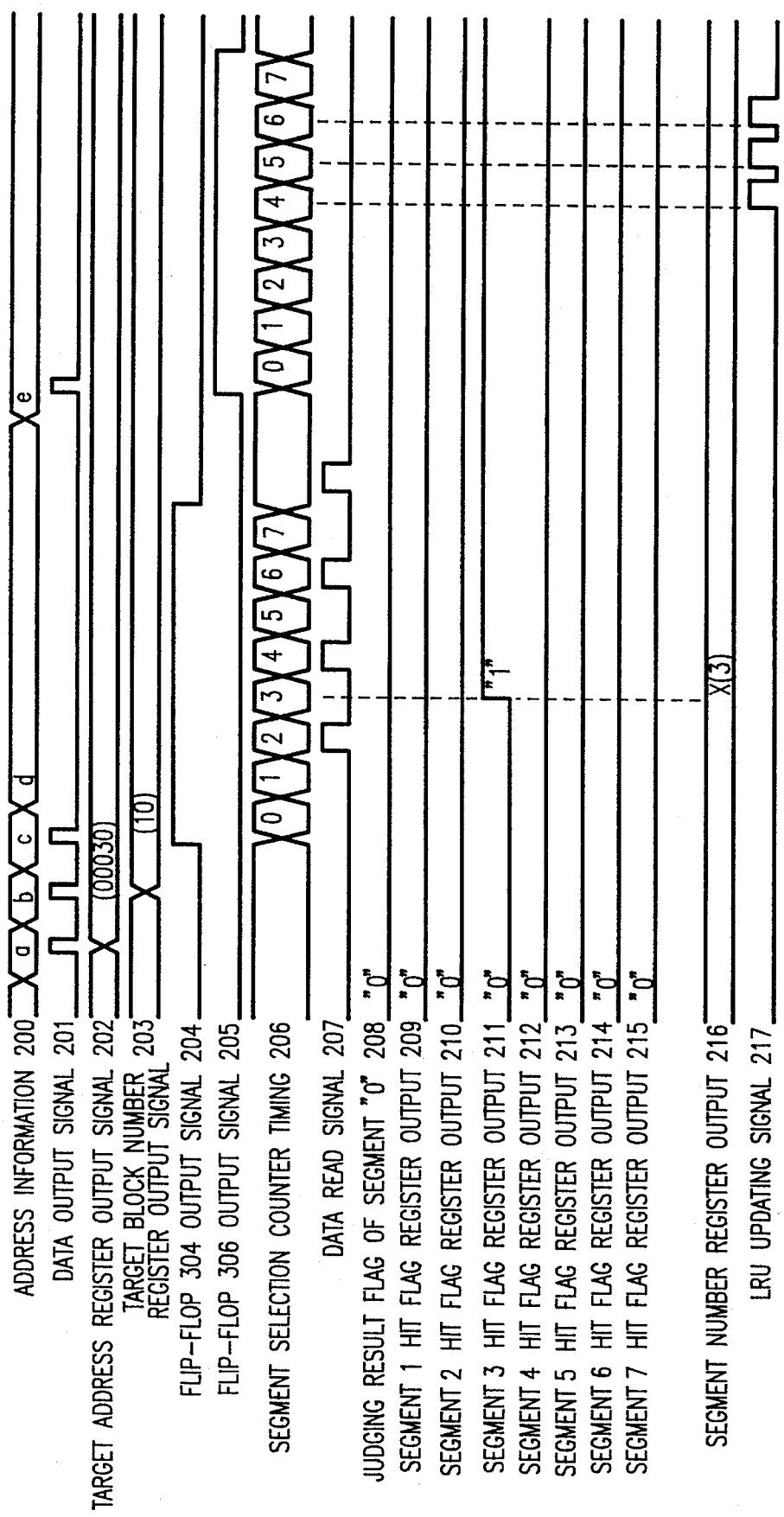
FIG. 4 is a timing chart for explaining the operation of the buffer memory controller shown in FIG. 2.

In FIG. 4, out of the address data bus signals of the microcontroller 22, numeral 200 shows only address information for convenience. 201 shows the data output signal of the microcontroller 22 and 207 shows the data read signal. 202 and 203 show the 'output signal of the target address register 103 and 'the output signal of the target block number register 104, respectively. 204 shows the output signal of the flip-flop 304 and 205 shows the output signal of the flip-flop 306. 206 shows the operating timing of the segment selection counter 310. 208 shows the judging result flag of the segment "0" and 209 shows the output of the hit flag register 120 of the segment "1". Similarly, the outputs of the hit flag resisters 120 to 127 of the segments up to "7" are shown. 216 shows the output signal of the segment number register 107, while 217 shows the LRU updating signal. The LRU updating signal compares an LRU value of a target segment with an LRU value of another segment, and if the LRU value of the comparing segment is smaller than the LRU value of the target segment, the microcontroller 22 updates the LRU value of the comparing segment by adding "1" and if the LRU value of the comparing segment is larger than that of the target segment, does not perform the updating.

Now, when instructed to read data of the block address "00030 and the block number "10", the microcontroller 22 executes the write command by specifying the address "a" of the target address register 103 to the address line 200 as shown in FIG. 4. In this case, the address signal is stored in the register 300 shown in FIG. 3 by the address latch signal being transferred on the signal line 131, decoded by the decoder 301 and written into the target address register 103 shown in FIG. 2 by this result, and the write signal is transferred on the signal line 132. The timings at this time are shown by the write signal for 201 in FIG. 4 and by the output signal of the target address register for 202.

In succession, by specifying address "b" of the target block number register 104, the microcontroller 22 executes the write command. In this case, the address signal is also stored in the register 300 shown in FIG. 3 by the address latch signal being transferred on the signal line 131, decoded by the decoder 301 and written into the target block number register 104 shown in FIG. 2 by this result, and the write signal is transferred on the signal line 132. Numeral 203 in FIG. 4 shows the output signal of the target block number register 104. Up to here, the block address "00030" is set in the target address register 103 and the block number "10" is set in the target block number register 104.

Then, the microcontroller 22 sets the corresponding address "c" of the flip-flop 304 on the address line 200, executes a write command and sets the flip-flop 304. Numeral 204 in FIG. 4 shows the timing of the output signal of this flip-flop 304.

When the flip-flop 304 has been set, the counter 310 in FIG. 3 sequentially counts the segments from "0" to "7" as shown by 206 in FIG. 4. The block hit judgment is executed by selecting the segment number of the directory memory according to the counted value and comparing the information read from the directory with the information of the registers 103 and 104. This judgment can be made, for instance, as described below.

The last block address of the target data is obtained from the target block address and the target block number and if the obtained address value is smaller than the top block address, the target data did not hit the corresponding segment data. In the same manner, the last block address of the data in the segment is further obtained and if this address value is smaller than the top block address value of the target data, it did not hit the corresponding segment data. These operations are executed for all segments under the control by a directory address generator 311 and an operation controller 312 shown in FIG. 3.

When the hit judgment is continuously carried out through addition and subtraction as described above, the segment "3" is hit and the hit flag "3" (the hit flag register 123) is set as shown by 211 in FIG. 4. At the same time, the segment number "3" is set in the register 107 as shown by 216 in FIG. 4. No actual judgment is carried out for the segment "7" as its valid flag is "0".

During this time, the microcontroller 22 waits reset of the signal 204 while observing it. When the signal 204 shown in FIG. 4 has been reset, the microcontroller 22 inspects the state of the hit flag. In this case, it will be convenient if the circuit has been so constructed that the state of the flip-flop 304 and the hit judging result can be simultaneously input through the address "d".

Now, knowing that the segment "3" has been hit, the microcontroller 22 executes a write command using the corresponding address "e" of the flip-flop 306 as the address. At this time, as the flip-flop 306 has been set, the counter 310 makes the count again and the address generator 311 generates a directory address corresponding to the counted value and directory information are sequentially read. The read LRU value is compared with the LRU value of the segment "3" in the replacement controller 313. If this LRU value is larger than the LRU value ("3" in this case) of the segment "3", nothing is carried out, and if it is smaller, "1" is added to that value.

Therefore, as to the segments "0", "1" and "2" the LRU values are larger than "3", the values remain unchanged. As to the segments "4" to "6" as the LRU values are smaller than "3", the updating signal will become "1" as a result of the comparison as shown by 217 in FIG. 4 and the LRU values are updated and stored again. Thereafter, the updating of the directory is completed with the LRU value of the segment "3" made to "0" and data of applicable blocks, that is, data of the fourth block through the tenth block of the segment "3" of the buffer memory 13 are taken out and transferred to the host computer.

Next, it is assumed that data of the block address "90000" and the block number "5" has been demanded. In the same manner as described above, when it is instructed to make the judgment with the target information set in the registers 103 and 104 and with the flip-flop 304 set, all the hit flag registers 120 to 127 are kept at "0" and the microcontroller 22 will know that no applicable data was hit.

Thereafter, the microcontroller 22 executes the write operation by specifying an address corresponding to the flip-flop 305 and sets the flip-flop 305. When the flip-flop 305 has been set, the buffer controller 102 sequentially generates directory addresses by starting the counter 310 and inspecting valid flags and LRU values. In the example shown in FIG. 9, as the valid flag of the segment "7" is "0", the segment number "7" is set in the register 107 and the operation of the buffer controller 102 for the segment selection is completed. Likewise the flip-flop 304 and the flip-flop 306 described above, the microcontroller 22 will know the completion of the operation of the flip-flop 305 when the flip-flop 305 has been reset. Thereafter, the microcontroller 22 generates a directory for the segment specified by the register 107 and stores it and furthermore, stores the target data in the segment corresponding to the buffer memory 13.

In the above example, in order to make the explanation simple, it has been explained that only demanded data are stored in the segment in the buffer memory 13. Actually, however, data may often be stored successively until the segments are filled or data in the prescribed length are stored until the next command is received by considering using efficiency, convenience of processing time, etc.

Equipped with hardware to execute the hit judgment and selection of replacing segments and updating of the LRU counter as described above, the hard disk drive is capable of remarkably improving its performance when compared with the operation and judging process by a microcontroller with all required information stored in a general purpose memory as in the past.

Figure 10:
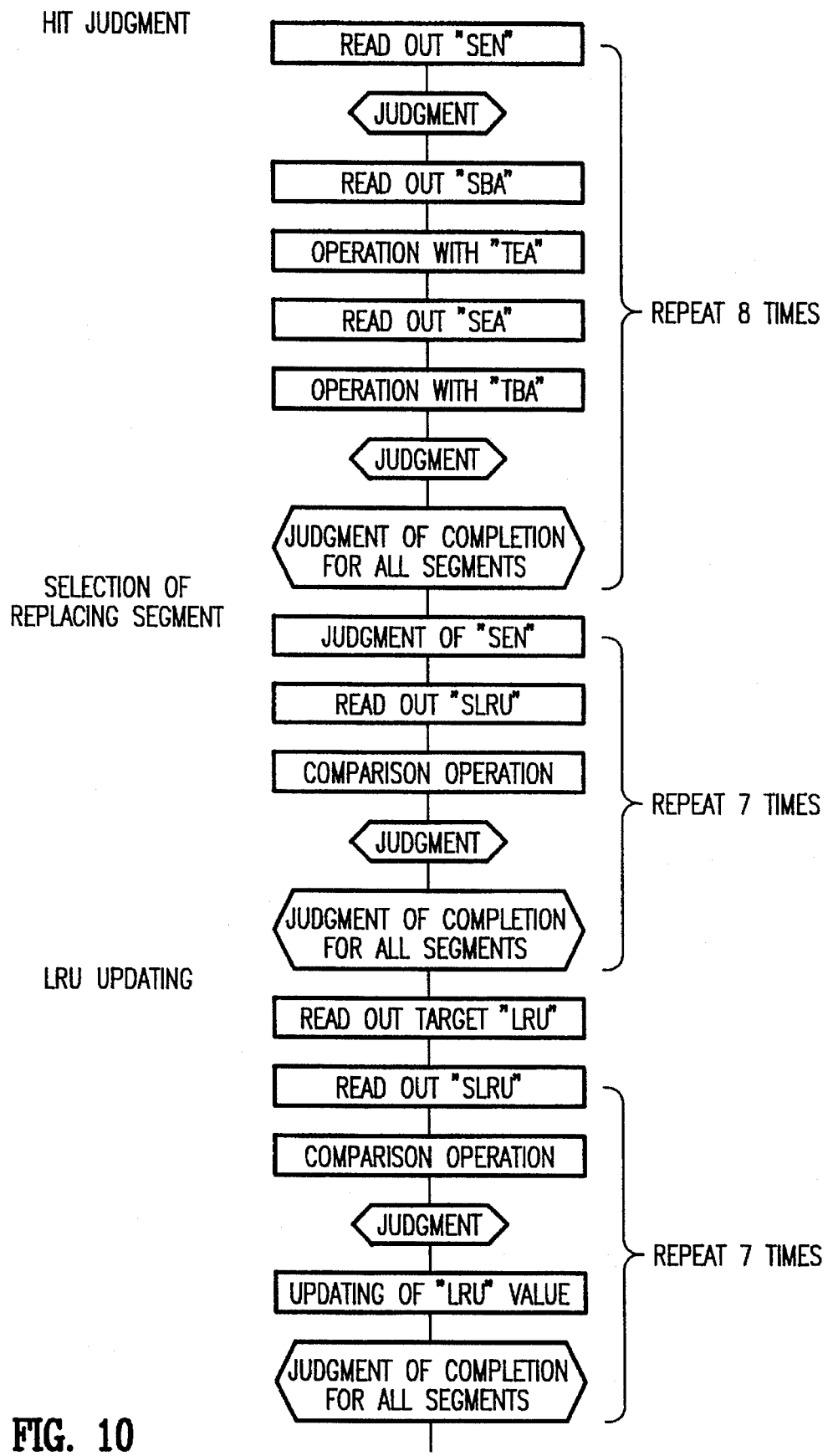
FIG. 10 is a flowchart showing the processes when executing hit judgment, selection of replacing segments and updating of information on replacement by a conventional microcontroller.

Shown in FIG. 10 is a program process when the hit judgment, selection of replacing segment and updating of replacement information are executed using a microcontroller according to a conventional method. In this figure, SEN shows a segment valid flag, SBA shows a top block address of data in a segment, TEA shows a target last block address, SEA shows a last block address of data in a segment and TBA shows a target top block address.

When a case where the process described above is executed using, for instance, a very general microcontroller of a cycle time of about 0.5 μsec is considered, even for a simplified process as shown in FIG. 10, a time more than 0.80 μsec is required. However, when hardware in the construction as in the present invention is used, it is possible to achieve the process in less than 20 μsec. Further, it is also possible to execute other processes during this time. If no target data are hit, in spite of subsequent process volume being large, this difference in processing time will become an overhead of the microcontroller, resulting in deterioration of process performance, and an expensive high efficient microcontroller may become necessary to solve this problem.

In the embodiment described above, the block address and block number of data in a segment are stored in the registers 111 (the second storage means) and 112 (the third storage means), and the target block address and block number to be accessed are stored in the registers 103 (the fifth storage means) and 104 (the sixth storage means). However, it is also possible to provide registers to hold the-top and last addresses of a data block instead of the registers 111 and 112 and registers to hold the top and last address of a target block to be accessed instead of the registers 103 and 104.

Also, in the above embodiment, the register 107 has been provided to specify a specific segment and set a segment number therein. The counter 310 may be used for this segment specification.

Further, in the above embodiment, the adder-subtracter 106 is used to compare information on block addresses in segments with information on the block address of target data to be accessed. This comparison may be achieved by a data comparator.

In the above embodiment, storage of information on the using state of data blocks (the register 113) and its updating are carried out by the second buffer memory controller 14e (the buffer memory control means) of the hard disk controller 14. Only this portion may be executed by the microcontroller 22 which is a data processing means.

In the above embodiment, all processes of the second buffer memory controller 14e are executed one by one according to a command given by the microcontroller 22. It may be designed so as to consecutively execute one of such functions as the block hit judgment and storage of information on the block hit, selecting of a segment for new storage and updating the register 113 to show a specific segment lastly used by one time of a command from the microcontroller 22.

Further, in the above embodiment, information on the using state of data blocks is stored in the register 113 and used for judgment of information on the using state. By providing a data comparator to compare information on the using state of data blocks for a specific segment with information on the using state of data blocks for other segments which are supplied sequentially, it is also possible to judge the information on the using state using this data comparator.

In addition, with an adder-subtracter for updating information on the using state of segments, it is also possible to update information on the using state based on the judging result of the information on the using state using the adder-subtracter.

Further, in the above embodiment, the buffer memory 13 has been divided into eight segments. The number of divisions is not restricted to eight. For instance, when processing large size data, the buffer memory 13 is divided into large size segments. That is, by making each segment size large, the entire number of segments is reduced. When processing small size data, the buffer memory 13 can be divided into small size segments. That is, by making each segment size small, the entire number of segments is increased. Thus, using efficiency of the buffer memory 13 is promoted. In this case, the drive is so constructed that a memory (the ninth storage means) is provided to store the number of segments "to be divided and the cache control is executed based on the number of segments stored in this memory.

Further, if the second buffer memory controller 14e has been provided with the adder-subtracter 106, it is possible to calculate the position and length of all or part of data (the partially hit data) of the target block to be accessed existing in the buffer memory 103 by selectively inputting the contents of the registers 111 and 112 (the second and the third storage means) and those of the registers 103 and 104 (the fifth and the sixth storage means) into the adder-subtracter 106.

Further, it is also possible to preset a block length for all or part of the segments, and this construction can eliminate the register 112 (the third storage means) and the register 104 (the sixth storage means).

As described above, the hard disk drive of the present invention has been equipped with a relatively cheap hardware for executing such functions as hit judgment, selection of replacing segments, and updating of LRU counters, which are controlled by the microcontroller. Thus, when the buffer memory of the hard disk drive is used as a cache memory, an overhead time for the cache control of the microcontroller can be reduced sharply, promoting using efficiency of the buffer memory. As a result, the performance of the hard disk drive can be remarkably promoted.

What is claimed is:

1. A disk drive comprising:
   a recording medium having plural blocks on tracks, each of the blocks being assigned a block address, data being recordable on and retrievable from each block;
   a buffer memory divided into plural segments each with a capacity for storing at least one block of data;
   means for recording and retrieving the data on and from the tracks;
   data processing means for controlling the recording and retrieving means;
   a buffer memory controller that is separate and apart from the data processing means for temporarily storing one of data read out of the recording medium and data from a host computer in the buffer memory under the control of the data processing means, the buffer memory controller including:
      first storage means for storing data indicating if valid data are stored in each of the segments;
      second storage means for storing block addresses of data stored in each of the segments;
      third storage means for storing block numbers of data stored in each of the segments;
      fourth storage means for storing information relating to a history of use of data stored in each of the segments;
      fifth storage means for storing a target block address to be accessed;
      sixth storage means for storing a block number of the target block to be accessed;
      segment information selecting means for selecting the first through the fourth storage means corresponding to a specific segment;
      seventh storage means for storing block hit information indicating that more than one target block specified by the fifth and the sixth storage means have the same block addresses as those of more than one block in the segment specified by the second and the third storage means;
      means for comparing, under control of the data processing means, block addresses in the segments stored by the second and the third storage means for the segments of which contents are indicated to be valid by the first storage means with the target block addresses stored by the fifth and the sixth storage means and if more than one target block to be accessed as specified by the fifth and the sixth storage means have the same block addresses as those of more than one block in the segments specified by the second and the third storage means, to store the block hit information in the seventh storage means corresponding to this segment;
      means for updating, under the control of the data processing means, the contents of the fourth storage means to indicate a specific segment most recently accessed for the segments of which contents are indicated to be valid by the first storage means;
      means for selecting, under the control of the data processing means, the segment to be written based on the contents of the first and the fourth storage means when data are newly stored in any segment of the buffer memory;
      means for setting, under the control of the data processing means, the contents of the first storage means corresponding to at least one specific segment so as to indicate that the contents of the corresponding segment are invalid; and
      means for accessing, under the control of the data processing means, at least a predetermined portion of the buffer memory as the corresponding data stored in the recording medium.

2. The disk drive according to claim 1, wherein the buffer memory controller sets the segment specification information to specify the segment in an eighth storage means if it is revealed that more than one target block to be accessed as specified by the fifth and the sixth storage means have the same block addresses as those of more than one block in the segment specified by the second and the third storage means as a result of the comparison by the comparing means.

3. The disk drive according to claim 2, wherein the eighth storage means includes a counter sequentially selecting and specifying the segments.

4. The disk drive according to claim 1, wherein the comparing means includes a data comparator.

5. The disk drive according to claim 1, wherein the fourth storage means and the updating means are contained in the data processing means.

6. The disk drive according to claim 1, wherein the buffer memory controller executes continuously one of such functions as the block hit determination and storage of the block hit information, selection of the segment for new storage and updating of the fourth storage means to indicate that a specific segment has been most recently accessed, according to an instruction given from the data processing means.

7. The disk drive according to claim 1, wherein the buffer memory controller includes a data comparator for comparing information relating to the history of use for specific segments with information relating to the using state for other segments which are sequentially supplied.

8. The disk drive according to claim 1, wherein the buffer memory controller includes an adder-subtracter for updating information relating to the using state of the segments.

9. The disk drive according to claim 1, wherein the buffer memory controller includes ninth storage means for storing the number of the segments which are divided from the buffer memory.

10. The disk drive according to claim 1, wherein the buffer memory controller includes an adder-subtracter for calculating positions and numbers of at least part of target block data to be accessed in the buffer memory based on the contents of the second, the third, the fifth and the sixth storage means.

11. The disk drive according to claim 1, the block numbers of data is preset for at least part of the segment.

* * * * *